THERMOELECTRIC GENERATOR

Filed Nov. 22, 1954 3 Sheets-Sheet 1

INVENTORS.
Robert W. Fritts,
Sebastian Karrer,
BY Brown, Jackson
Boettcher & Dienner Att'ys.

INVENTORS.
Robert W. Fritts,
BY Sebastian Karrer,
Brown, Jackson,
Boettcher & Dienner Attys.

Oct. 28, 1958 R. W. FRITTS ET AL 2,858,350

THERMOELECTRIC GENERATOR

Filed Nov. 22, 1954 3 Sheets-Sheet 3

INVENTORS.
Robert W. Fritts,
BY Sebastian Karrer,
Brown, Jackson, Boettcher & Dienner
Atty's.

United States Patent Office 2,858,350

Patented Oct. 28, 1958

2,858,350

THERMOELECTRIC GENERATOR

Robert W. Fritts, Elm Grove, Wis., and Sebastian Karrer, Port Republic, Md., assignors, by mesne assignments, to Minnesota Mining and Manufacturing Company, St. Paul, Minn., a corporation of Delaware Application November 22, 1954, Serial No. 470,193

8 Claims. (Cl. 136—4)

This invention relates to thermoelectric generators and more particularly thermocouples the output of which is controllable for any given temperature difference between the thermocouple junctions independently of such temperature difference.

As is well known in the art, the output of a thermocouple is dependent primarily upon the temperature differential between the hot and cold thermocouple junctions. Accordingly, with variation in such differential the output of the generator varies. This is particularly marked during periods when the hot junction is being heated or cooled as, for example, by subjection of the thermocouple to a source of heat and subsequent removal therefrom. In the first case the generator output builds up slowly over the period of time taken to heat the hot junction while in the second case the output decreases slowly as the hot junction cools. The period of time over which this takes place, even assuming that the thermocouple hot junction is subjected on the one hand to maximum heat, and on the other hand to complete removal of the heat source, is substantial. Moreover, such time delay is inherent for each thermocouple and the output is dependent in the main upon the temperature difference between the junctions.

The aforedescribed inherent characteristics of known thermoelectric generators, i. e. the slow build-up of output with heating, and the slow decrease of output upon cooling of the thermocouple junctions, has been extremely troublesome where the load energized from the generator on the one hand has a tendency to "creep" as the output builds up, or, on the other hand, is desired to be deenergized promptly upon cooling of the thermocouple. As an example of the latter, thermoelectric generators of the character aforedescribed have particular utility as a source of electric power for energization of control devices, for example, devices for controlling flow of fluid fuel to a burner wherein the thermoelectric generator is subject to the heat of a pilot flame, and it is desired to shut off the flow of fuel in the shortest possible time after extinguishment of the pilot flame to prevent dangerous accumulation of unburned fuel.

Accordingly, a primary object of the invention is to provide thermoelectric generators the output of which is controllable independently of the inherent rate of heating and/or cooling of the generator.

Another object is to provide a thermoelectric generator the output of which is impressed upon the generator terminals as a factor of the temperature of the generator.

Another object is to provide thermoelectric generators the output of which is reduced or removed from the generator terminals at predetermined values of output.

Another object is to provide thermoelectric generators the output of which is impressed upon the generator terminals a predetermined time after subjection of the generator to heating.

Another object is to provide thermoelectric generators the output of which is reduced at or removed from the generator terminals a predetermined time after subjection of the generator to cooling.

Another object of the invention is to provide thermoelectric generators in which the output value at which the generator output is impressed upon the generator terminals is adjustable.

Another object is to provide thermoelectric generators in which the output value at which the generator output is reduced at or removed from the generator terminals is adjustable.

Another object of the invention is to provide thermoelectric generators in which the terminal voltages may be diminished rapidly with respect to the rate of cooling of the hot junction of the generator.

Another object is to provide thermoelectric generators in which the rate of decay of the terminal output is adjustable.

Another object is to provide thermoelectric generators in which the full desired output may be impressed upon the generator terminals at a predetermined output value and at a predetermined time following subjection of the generator to heat.

Another object is to provide thermoelectric generators in which the rate of build-up of the terminal output and in which the output value which is impressed upon the generator terminals is adjustable.

Another object is to provide in a thermoelectric generator means for controlling the thermoelectric circuit to the generator terminals.

Another object is to provide in thermoelectric generators means for interrupting and/or shunting the circuits to the generator terminals.

Another object is to provide in a thermoelectric generator thermocouple elements having different coefficients of thermal expansion whereby movement of one element with respect to the other with changes in temperature is afforded for control of circuits to the generator terminals.

Another object is to provide thermoelectric generators including temperature responsive switching means for control of circuits to the generator terminals.

Another object is to provide thermoelectric generators of the aforementioned character which may be subjected to relatively high temperatures for generation of relatively high voltages without danger of deterioration of the thermocouple elements, and more particularly to provide thermoelectric generators of the aforementioned character in which at least one thermocouple element is of semi-metallic composition and is hermetically sealed from ambient atmosphere for protection of such element.

Another object is to provide thermoelectric generators of the aforementioned character which are simple in construction and readily adapted to mass production techniques for low cost.

Other objects and advantages will hereinafter appear or readily suggest themselves to those skilled in the art from the following description, it being understood that the embodiment described herein and shown in the drawings is illustrative only, reference being made to the appended claims for determination of the scope of the invention.

Figure 4:
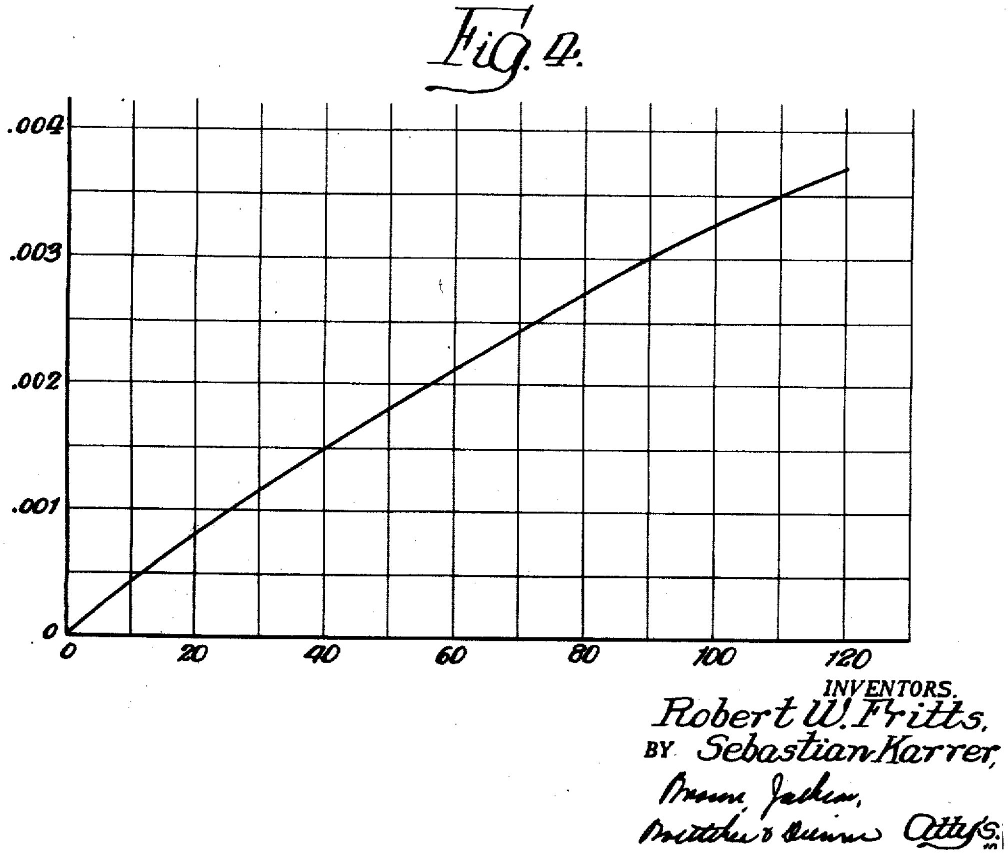
Figure 5:
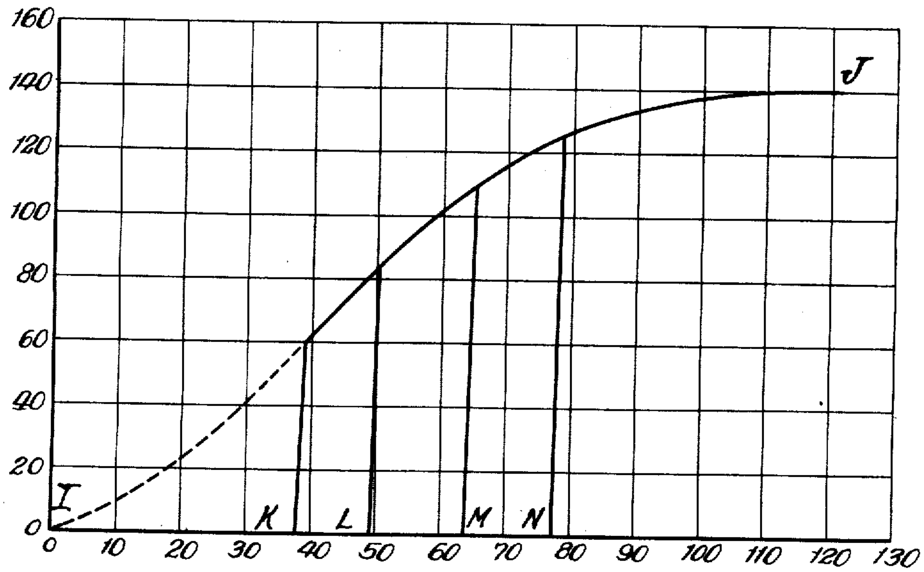
Figure 6:
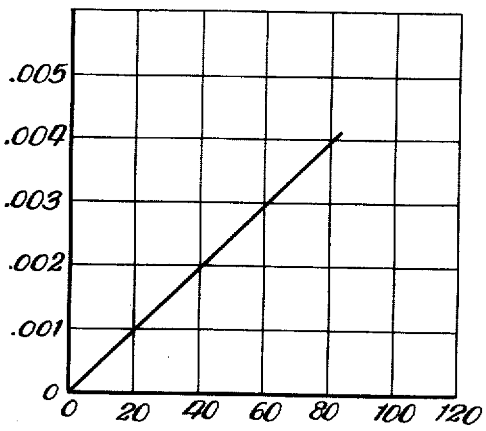

Figure 4 graphically illustrates adjustability of such time response in thermoelectric generators constructed in accordance with the present invention;

Figure 5 is a graphic illustration of the time response to heating of thermoelectric generators constructed in accordance with the present invention; and Figure 6 graphically illustrates adjustably of such time response to heating of thermoelectric generators constructed in accordance with the present invention.

Figure 1:
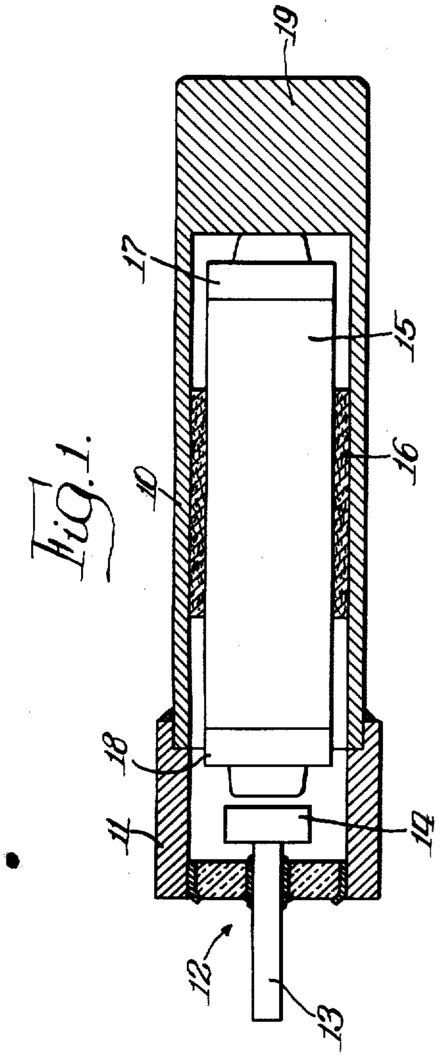
Figure 1 is a longitudinal cross-sectional view of a thermoelectric generator constructed in accordance with the present invention.

Referring now to Figure 1 of the drawings, reference numeral 10 designates a generally cup-shaped cylindrical sheath comprising one thermoelectric element or electrical conductor of the thermocouple of generator shown. Secured to the open end of sheath 10 is a cold junction tubular housing 11 forming an axial extension of the sheath 10. An electrode mounting unit 12 is positioned in the open end of the cold junction housing 11. A cold junction contactor 13 extends in electric insulated relation through the unit 12 and at its inner end is formed with a contact portion 14. The assembly comprising the sheath 10, the cold junction housing 11, the unit 12 and cold junction contactor 13 form an enclosed chamber in which a second thermocouple element or electrical conductor 15 is disposed. A tubular fiber glass bushing 16 surrounds the inner thermocouple element or electrical conductor 15 to dispose it in spaced and electrically insulated relation with respect of the inner surfaces of the outer thermocouple sheath 10 and cold junction housing 11. The second inner thermocouple element or electrical conductor 15, as shown, is provided with contacts 17 and 18 at its opposite ends. The contact 17 is adapted to have contacting engagement with the closed end 19 of the tubular sheath 10. The end portion 19, as will presently appear, serves as a hot junction for the thermocouple or generator. The contact 18, as will appear hereinafter, is adapted to have contacting engagement with the contact portion 14 of the cold junction contactor 13.

In a device of Figure 1 above described, the thermoelectric elements 10 and 15 necessarily are separated from each other in the thermoelectric series and are further characterized by having different coefficients of thermal expansion and contraction (linear). For such purposes the outer thermoelectric element 10 may be fabricated of a ferritic stainless steel and the inner thermoelectric element 15 may comprise constantan or Copel. A suitable ferritic stainless steel for the element 10 may, for example, be a high chromium stainless steel alloy, which type of stainless steel affords good resistance to high temperature scaling and oxidation, and hence is extremely well adapted to use in thermoelectric generators, which are often subjected to relatively high temperatures.

Ferritic stainless steels abovementioned have a relatively low thermal expansion coefficient, i. e. of about $11\times10^{-6}/°$ C., compared to the thermal expansion coefficients of constantan and Copel which are of the order of $18.8\times10^{-6}/°$ C. Thus, in the particular arrangement of the generator of Figure 1, the coefficient of linear thermal expansion and contraction of the inner element 15 is greater than that of the outer element 10. In assembly of the device the cold junction contactor 13 of the mounting unit 12 is placed in the open end of the cold junction housing 11 with the contact portion 14 of the cold junction contactor 13 in engagement with contact 18 and positioning the element 15 to engage contact 17 with the closed end 19 of the sheath 10. The electrode mounting unit 12 may then be withdrawn a predetermined amount and soldered in place. With the unit thus assemblied it will be seen that upon subjection of the hot junction 19 to a source of heat that the inner thermoelectric element 15 will extend linearly or extend axially relative to the outer element or sheath 10 of the cold junction housing 11 to establish electrical contact between contact 17 and closed end 19 of sheath 10 and contact 18 with the contact portion 14 of the cold junction conductor 13 to complete a circuit. Electrical connections may be suitably made to the stem portion of cold junction conductor 13 and cold junction housing 11 for utilizing the thermoelectric power developed by the generator. Upon extinguishment or diminishment of the source of heat at the hot junction 19 of the outer sheath electrical contacts of the inner thermocouple element 15 with the outer thermocouple element 10 will be interrupted. It will be observed therefore that the difference in thermal expansion coefficients of the outer sheath 10 and inner thermocouple element 15 afford a switching means for opening and closing an internal electrical circuit of the generator.

Alternatively, when the device of Figure 1 is to be utilized for high temperature application and/or for high output it is preferable to fabricate the second thermocouple element or electrical conductor 15 of "semi-metallic alloys," which will be understood, as hereafter employed throughout this specification and in the appended claims, as meaning an alloy having high thermoelectric power, nominally higher electrical resistivity, and low thermal conductivity with respect to like characteristics ordinarily exhibited by metals. It is, of course, essential for purposes of the present invention that such semi-metallic alloys have a different coefficient of thermal expansion and contraction than that of element 10.

Such semi-metallic thermoelectric element or electrical conductor 15 may, for example, be made of the semi-metallic alloys disclosed and/or claimed in the application of Sebastian Karrer, Serial No. 392,648, filed November 17, 1953, which application has been abandoned in favor of continuation-in-part application of Sebastian Karrer, Serial No. 475,540, filed December 15, 1954, now Patent No. 2,811,570. In this application there is disclosed compositions of lead and either one or both of the elements selenium and tellurium in which the lead content ranges linearly from a minimum of 61.95% by weight and a maximum of 65.0% by weight, when the balance is substantially all tellurium, to a minimum of 72.45% by weight and a maximum of 75.0% by weight when the balance is substantially all selenium. These compositions should also not contain deleterious metallic impurities of an order in excess of 0.01% and should be oxygen free. It is known that selenium and tellurium are commonly present one in the other and suitable electrical conductor elements for the purposes of this invention may be produced, as related in both of the last-mentioned applications, containing both selenium and tellurium provided the proportions of these constituents with respect to the lead content are kept within the aforementioned ranges.

Compositions within the range of the aforementioned application Serial No. 392,648 afford high thermoelectric power and low resistivity and are also characterized by good mechanical strength and high chemical stability even at elevated temperatures. For example, a composition containing 63.0% lead, balance substantially all tellurium, after high temperature annealing, has a thermal e. m. f. of minus 275 microvolts per degree C. against copper, and a resistivity of .001 ohm-cm. at room temperature. (The electrical resistivities of the aforedescribed compositions have positive temperature coefficients.) A centimeter cube of a lead-tellurium composition, containing 62.5% lead, balance substantially all tellurium, delivers about 1.5 watts to a match external load when a temperature difference of 555° C. is maintained between opposite faces and said faces connected to an electric circuit. Furthermore, compositions in this range have compressive strengths greater than 700 kilograms per square centimeter and electrical conductors of compositions in this range utilized as thermocouple elements can be operated with the hot junction at 570° C. in an inert or reducing atmosphere. Electrical conductors exceeding the range of from a minimum of 61.95% to a maximum of 65.0% lead, balance substantially all tellurium, to a minimum of 72.45% and a maximum of 75.0% lead, balance substantially all selenium, will not provide conductors affording all of the desired electrical and physical properties aforementioned.

Compositions of lead, selenium and tellurium affording the desired electrical and physical properties aforementioned may be produced as disclosed, for example, in both of the aforementioned applications by the following method: The starting constituents, free of metallic contaminants as aforeindicated and preferably in a reduced state are mixed together in the proportions indicated hereinabove and sealed in a tube or container, preferably of quartz or Vycor, the container first being evacuated. The tube and its contents are then heated to the melting point of the latter which occurs at a temperature of from about 920° to 1085° C. depending upon the proportions of the selenium and tellurium constituents, as further disclosed and claimed in the application last mentioned. During such heating the molten mass is preferably agitated to insure good mixing, and then cooled.

After the composition has been formed as aforementioned, the solidified ingot can be removed from the tube and cast in molds of graphite or the like under an atmosphere of inert gas. More specifically, during casting it has been found preferable to cover the mold with an inert gas such as, for example, argon or carbon dioxide under a positive pressure. This gas suppresses the vaporization rate of the molten composition thereby reducing porosity of the casting.

The aforedescribed alloying and casting steps should be carried out in crucibles which do not react with or contaminate the composition, since, as aforeindicated, minor amounts of undesired impurity may very deleteriously affect the electrical and/or physical properties of the element. Suitable crucibles may be those of carbon, alundum, pre-fired lavite and Vycor or quartz.

After casting, the ingots may be machined if desired. The shaped ingots are then preferably annealed in a reducing atmosphere at from 540° C. to 815° C. for from 10 to 20 hours. This annealing treatment insures homogeneity of the ingot and enhances its electrical and physical properties.

Alternate methods of forming the aforementioned compositions are further disclosed in application Serial No. 392,648 and to which reference may be had.

Compositions aforedescribed of the application first mentioned also exhibit the desired physical properties aforementioned. More specifically, they are mechanically strong and stable under operating conditions. The compositions in the mid-range are more brittle and are more resistant to plastic deformation than are compositions at either end. Importantly for purposes of the presently described embodiment of the invention the coefficients of thermal expansion (linear) lie within the range of from $20\times10^{-6}/°$ C. to $16\times10^{-6}/°$ C. which, it will be observed, is substantially greater than the thermal expansion coefficient of the ferritic stainless steel sheath 10, which, as aforementioned, is of the order of $11\times10^{-6}/°$ C. Moreover, such compositions afford higher thermal efficiencies than do metals because of the low thermal conductivity of said compositions (about .02 w./cm./° C.).

Also, if desired, a semi-metallic element 15 suitable for use with the present invention as disclosed in the application of Robert W. Fritts and Sebastian Karrer, Serial No. 442,844, filed July 12, 1954, may be fabricated of a lead-tellurium base composition or alloy consisting essentially of lead in a range of 61.95% to 63.0% by weight, balance substantially all tellurium, and which base composition contains not more than 0.001% by weight of other matter.

Lead-tellurium base alloys within the aforementioned range and of the aforementioned purity are negative electrical conductors and exhibit high negative thermoelectric power, nominally higher electrical resistivity, and low thermal conductivity with respect to a metal, and have coefficients of thermal expansion (linear) within the range last above-mentioned.

In lead-tellurium base alloys of the aforementioned range and purity, the magnitudes of the thermoelectric power and electrical resistivity of the aforementioned base lead-tellurium alloys are strongly dependent upon the heat treatment afforded the alloy during fabrication, thereby affording control over such properties by the heat treatment. For example, a lead-tellurium alloy within the above-stated range of composition, which has been annealed for several hours at from 540° C. to 815° C. and then quenched, exhibits lower thermoelectric power and electrical resistivity than do the same alloys which have been similarly annealed and then cooled slowly to lower temperatures. The following table, identified as Table I, from the application last referred to, sets forth representative electrical properties, at room temperatures, of the lead-tellurium alloys aforedescribed as a function of the quenching temperature. The data of Table I represents lead-tellurium alloys which have been annealed at from 540° C. to 815° C. and slowly cooled (e. g. 50° C. per hour) to the indicated temperatures in column 1, and from which temperatures they were quenched.

*Table I*

| Equilibrium Temperature Prior to Quenching | Thermoelectric Power, Microvolts/° C. | Resistivity, Ohms-Cm. |
|---|---|---|
| 815° C. | −316 | 0.0023 |
| 704° C. | −352 | 0.0034 |
| 538° C. | −396 | 0.0074 |
| 427° C. | −414 | 0.0150 |
| 316° C. | −414 | 0.0173 |
| 204° C. | −414 | 0.0175 |

In the application last referred to it is disclosed that since the electrical properties of the aforementioned alloys or compositions are dependent upon the equilibrium temperature from which they have been quenched, use of such alloys or compositions is limited to such temperatures as will not affect the electrical characteristics established by the quenching treatment. Accordingly, for high temperature applications requiring fixed values of electrical characteristics arbitrary changes in these characteristics must be derived from the adjustment of factors other than temperature and annealing history.

As related and claimed in the last-mentioned application, the electrical characteristics of lead-tellurium base alloys or compositions of the aforementioned range and purity can be markedly and advantageously altered in a reproducible manner by the addition thereto of controlled amounts of matter other than lead or tellurium. For convenience, these additions are herein designated "third element additions" to distinguish them from the lead and tellurium constituents of the alloys.

The "third element additions" effective for the purposes indicated when added in minor amounts to the lead-tellurium base alloy aforementioned are: Bismuth, tantalum, manganese, zirconium, titanium, aluminum, gallium, chlorine, bromine, iodine, sodium, potassium, thallium and arsenic.

The third element additions aforementioned may be either "positive promoters" or "negative promoters" as hereinafter defined, and the resultant alloy or composition may be a "positive" or "negative" alloy or composition or conductors, as also hereinafter defined.

A "negative" composition or alloy and a "negative" conductor is to be understood as meaning an alloy, composition or conductor which exhibits negative conductivity as evidenced by Hall effect measurements or thermoelectric effect measurements, both taken at room temperature. Similarly, a "positive" composition or alloy and a "positive" conductor is to be understood as meaning an alloy, composition or conductor which exhibits positive conductivity as evidenced by Hall effect measurements or thermoelectric effect measurements, both taken at room temperature.

"Negative promoters" are those which, when added to the lead-tellurium base alloy previously defined, alter the electrical conductivity without changing the polarity of the conductivity or thermoelectric power of the base alloy (it being negative according to the preceding definition). "Positive promoters" are those which, when added to the lead-tellurium base alloy, cause at first, with very small additions, reduction in the conductivity of the alloy to a minimum value beyond which further increase in the concentration of the positive promoter causes an increase in the conductivity of the alloy accompanied by a reversal in the polarity of the conductivity and thermoelectric power, i. e., from negative to positive.

The functions of such negative and positive promoters as disclosed in the last mentioned application are contrasted for sake of clarity as follows:

(1) Increasing concentrations of the negative promoter elements cause increases in the conductivity and decrease of the thermoelectric power of the resulting alloy, as compared to that of the lead-tellurium base alloy, while preserving the negative polarity of the conductivity and thermoelectric power thereof.

(2) Increasing concentrations of positive promoter elements cause initially reductions in the conductivity and increase in the thermoelectric power of the lead-tellurium base alloy, until a minimum conductivity is reached whereupon the thermoelectric power and conductivity reverse polarity to the positive sense, and further increase in the concentrations of the positive promoter causes increase in the conductivity and decrease of the thermoelectric power in the resulting alloy.

Table II below, first column thereof, lists certain elements which are effective as negative promoters when added to the aforementioned lead-tellurium base alloys or compositions. Second column of Table II lists the order of the maximum concentration limits by weight percent of such promoters to the base alloy. As related in the last mentioned application these concentration limits are the maximum which effectively alter the electrical properties of the base alloy. Concentrations in excess of the stated amounts of such additives have no appreciable effect in beneficially altering the electrical properties of the electrical conductors with which this invention is concerned, and in this sense the limits indicated are to be considered critical. The third and fourth columns of Table II set forth the electrical properties at room temperature of lead-tellurium alloys promoted with the maximum useful concentrations of the negative promoters, after high temperature annealing as hereinafter disclosed.

*Table II*

| Negative Promoters | Order of Maximum Effective Concentration Limits by Weight Percent | Thermoelectric Power, Microvolts/° C. | Resistivity, Ohms-Cm. |
|---|---|---|---|
| Bismuth | [1] 0.60–1.20 | −72 | 0.00031 |
| Tantalum | 0.50 | −121 | 0.00032 |
| Manganese | 0.25 | −113 | 0.00036 |
| Zirconium | 0.25 | −23 | 0.00012 |
| Titanium | 0.15 | −45 | 0.00020 |
| Aluminum | 0.10 | −59 | 0.00016 |
| Gallium | 0.25 | −36 | 0.00015 |
| Chlorine | 0.10 | −45 | 0.00019 |
| Bromine | 0.20 | −47 | 0.00015 |
| Iodine | 0.25 | −46 | 0.00015 |

[1] The range set forth is discussed below.

As previously mentioned, the application last referred to also relates that certain positive promoters may be alloyed with the aforementioned lead-tellurium alloys, and such promoters are listed in column 1 of Table III below. The second column of Table III, like the corresponding column of Table II, sets forth the order of the maximum concentration limits by weight percent of such promoters to the base alloy effective for achieving the objects of the invention. (Again, it will be observed that concentrations of the positive promoters to the lead-tellurium base alloy in amounts in excess of that contained in column 2 of Table III have no appreciable effect in beneficially altering the electrical properties with which this invention is concerned and in this sense the limits indicated are to be considered critical.)

Column 3 of Table III sets forth the concentration by weight percent of the positive promoters listed at which the polarity of conductivity and thermoelectric power of the promoted alloy reverses.

Columns 4 and 5 set forth the thermoelectric power and resistivity characteristics at room temperature of the alloy or composition resulting from the addition of the aforedescribed positive promoters in the amount shown in column 2 after high temperature annealing and subsequent slow cooling as hereinafter disclosed.

*Table III*

| Positive Promoters | Order of Maximum Effective Concentration Limit By Weight Percent | Concentration-Weight Percent at Which Polarity Reverses (Point "a," Figures 1 and 2) | Thermoelectric Power, Microvolts/° C. | Resistivity, Ohms-Cm. |
|---|---|---|---|---|
| Sodium | 0.06 | .0002 | +173 | 0.00074 |
| Potassium | 0.10 | .0004 | +198 | 0.00076 |
| Thallium | [1] 0.25–1.00 | [1] .005 to .02 | +256 | 0.00290 |
| Arsenic | [1] 0.07–0.25 | [1] .0008 to .002 | +270 | 0.00450 |

[1] The range set forth is discussed below.

The lead-tellurium base alloy previously described, is metallographically a two-phase alloy. For a fuller description of the two phases of the lead-tellurium base alloy, reference may be had to the application last above mentioned. When the aforedescribed third element additions are incorporated in the base alloy, such third element additions become distributed between the two phases. The nature of such distribution has negligible effect upon the electrical properties of the composition in all cases except that of bismuth, thallium and arsenic. Accordingly, in the case of bismuth, thallium and arsenic, the maximum effective concentration is dependent upon the lead content of the lead-tellurium base alloy within the ranges stated therefor in Tables II and III. It has been found 1.20% by weight bismuth to be the maximum effective concentration for lead-tellurium base alloys containing 63.0% lead; for base alloys containing less lead the maximum effective bismuth concentration is somewhat less, that is ranges down to 0.60% by weight when the lead content ranges down to 61.95%. Similarly, in the case of thallium, the maximum effective concentration is dependent upon the lead content of the lead-tellurium base alloy within the range stated therefor. It has been found that 1.00% by weight thallium to be the maximum effective concentration for lead-tellurium base alloys containing 63.0% lead; for base alloys containing less lead, the maximum effective thallium concentration is somewhat less, that is ranges down to .25% by weight when the lead content ranges down to 61.95%. Similarly, in the case of arsenic, the maximum effective concentration is dependent upon the lead content of the lead-tellurium base alloy within the range stated therefor, and ranges from 0.25% for base alloys containing 63.0% lead down to 0.07% for base alloys containing 61.95% lead. As indicated in Table III, the concentration weight percent at which the polarity reverses in the case of thallium promoted base alloy ranges from .005 to .02 as the lead constituent of the lead-tellurium base composition varies from 61.95% to 63.0%. Similarly, in the case of the arsenic promoted base alloy the concentration weight percent at which polarity reverses ranges from .0008 to .002 as the lead content of the base alloy varies from 61.95% to 63.0%. This behavior of bismuth, thallium and arsenic is thought to be due to the formation of a bismuth-lead-tellurium, a thallium-lead-tellurium or an arsenic-lead-tellurium complex within an intergranular phase which accounts for a portion of the addition. All other third element additions aforementioned, both positive and negative, form complexes with a second or intergranular phase aforementioned to a much lesser extent than do bismuth, thallium and arsenic and for the purposes of this invention, in the cases of such other additions these effects are inconsequential. Accordingly, no change in the concentration limits thereof are necessary as the proportions of lead and tellurium in the base alloy vary within the range stated therefor.

In Tables II and III above, the thermoelectric power and resistivity data given is in both cases for the 61.95% lead, balance substantially all tellurium composition containing the third element addition in question in the amount indicated in the table (in the case of bismuth, thallium and arsenic, the lower maximum effective amount indicated).

The last described alloys or compositions of the application last mentioned may be fabricated in the same manner previously described in connection with the application of Sebastian Karrer, Serial No. 392,648.

The above third element promoted alloy or composition of the application last mentioned is a two-phase alloy having improved electrical properties as compared to the corresponding properties of the lead-tellurium base alloy. For example, the electrical properties of conductors of the third element addition promoted alloys or compositions are governed to a lesser extent by the heat treatment given the alloy, with variations in electrical properties considerably less than the variations exhibited by the lead-tellurium base alloy to which no third element has been added. Thus, the third element additions, in effect, reduce the dependency of the electrical properties upon prior heat treatment and in this sense tend to stabilize these properties to a higher degree than that achieved in the lead-tellurium base alloy. It may be stated as a general observation that the degree of stabilization increases with the concentration of the aforementioned third element additions up to the maximum effective amount thereof as above set forth. This lesser dependency of third element addition promoted alloys or compositions aforedescribed and of the electrical conductors comprising the same, markedly increases the utility thereof for high temperature applications. In this connection, however, where alloys including positive promoters are concerned and where the application temperature approaches 570° C. concentrations of the positive promoter approaching the maximum effective limit aforementioned should be used to insure maintenance of positive polarity of the composition.

Like the compositions or alloys of the application of Sebastian Karrer, Serial No. 392,648, first described, the third element promoted compositions of the application of Robert W. Fritts and Sebastian Karrer, Serial No. 442,846, are mechanically strong and stable under operating conditions and have coefficients of linear thermal expansion within the aforementioned range of $20\times10^{-6}/°$ C. to $16\times10^{-6}/°$ C. which, as previously noted, is substantially greater than the like thermal expansion characteristic of ferritic stainless steel, of the order of $11\times10^{-6}/°$ C., of which the sheath 10 or outer thermocouple element is fabricated in the preferred form of our invention.

When semi-metallic alloys are used for the inner thermoelectric element special consideration must be given to providing it with contacts such as contacts 17 and 18 shown in Figure 1.

It has been discovered, as disclosed and claimed in the copending application of Russell E. Fredrick, Robert W. Fritts and William V. Huck, Serial No. 442,866, filed July 12, 1954, that for electrical conductor elements of the character under consideration, a contact electrode comprising iron or certain iron alloys affords contacts of low thermal and electrical resistance and are chemically stable. The contacts may, as will be explained hereinafter and as disclosed in detail in the application last referred to, be applied by mere pressure or may be bonded to the elements. The bonded form of iron contacts hereinafter referred to provide mechanically strong bonds.

Iron is acceptable as an electrode for the semi-metallic thermoelectric elements aforedescribed in that it does not alloy or dissolve in such elements at temperatures below 700° C., which is well above the ordinary upper limit of operating temperatures therefor. Alloying or solution between the electrical conductor elements, and iron or iron alloy contact electrodes, takes place at above 730° C., thereby permitting bonded contacts for the thermoelectric elements to be formed very simply, in accordance with the invention of the last referred to application as will hereinafter appear. Moreover, a reversal of the alloying or solution below approximately 700° C., it has been found, purges the thermoelectric elements of any atomically dispersed iron which might otherwise seriously alter the electrical properties of such elements. Such minor amounts of iron as remain dispersed in the aforementioned semi-metallic thermoelectric elements in the form of small precipitated particles after formation of the bonded contact not only have a negligible effect upon the electrical properties of the elements, provided the amount of such dispersed iron is controlled, as will hereinafter be described, but also the presence of such minor iron concentration, it has been found, increases the strength of the thermoelectric elements markedly since small particles of precipitated iron at the grain boundaries thereof appear to lock the grains together. It is, however, important as disclosed in the application last mentioned that the iron be so controlled in amount and dispersed so that there will be no serious effect upon the thermoelectric properties of the thermoelectric elements. It has been found that if the iron concentration is held to less than 0.5% by weight of the thermoelectric element, the thermoelectric power and electrical resistivity thereof will be reduced by only about 10%. The iron concentration can be held to within the aforementioned limit by forming the bonded contact in accordance with methods which will now be described.

A method of forming bonded contact electrodes of iron with thermoelectric elements of the abovementioned alloys or compositions stems from the fact related in the last mentioned application that iron dissolves slowly in such alloys or compositions at about 730° C., that such alloys or compositions exhibit reduced melting points when laden with a few percent iron, and that, in fact, such melting points may lie below the phase transformation temperature of iron (905° C.). It is observed in the application last mentioned that as little as 2.0% by weight iron affords an alloy having a melting point below the aforementioned transformation temperature of pure iron. Further detailed data in this regard is set forth in the application last referred to and to which reference may be had. As will be apparent, a simple technique is thus provided by which bonded electrodes may be formed with iron or iron alloys since contact formation can take place at a temperature below that at which the phase transformation of iron occurs. Moreover, the method utilizing this technique about to be described, results in considerably less contamination of the electrical conductor element with iron after contacting than the .5% limit aforementioned. In fact, contamination resulting from this method generally is less than a few hundredths of one percent.

The method of the last referred to application of utilizing iron to lower the melting temperature of the aforementioned alloys or compositions may conveniently be denominated a fusion method. In this method, as described and claimed in the last-mentioned application, a thermoelectric element of the aforementioned alloys or compositions, preformed as aforedescribed, is pressed against the surface of an iron or iron alloy electrode, and the electrode is then heated, preferably inductively, until a very thin layer of the alloy or composition becomes molten and fuses with the surface of the electrode. During such heating, the iron migrates slowly into the adjacent surface of the thermoelectric element, reducing the melting point of a thin layer of the latter. Due to its thin section the molten layer rapidly approaches the compositions which solidify at temperatures below the phase transformation temperatures of the iron to form the bond. Accordingly, the time of heating is only a matter of a few seconds, after which the assembly is allowed to cool.

It is also feasible according to the disclosure of the last mentioned application to cast such semi-metallic element and form the contact electrode simultaneously in accordance with the following method, for convenience denominated the "direct casting" method. Iron is placed in a mold, preferably of graphite, and any of the aforementioned alloys or compositions in chunk or granular form is also placed therein in contiguous engagement with the iron. The mold is then heated, preferably in a reducing atmosphere, to the melting point of such alloy or composition, that is, within the temperature range of 920° C. to 1100° C. for a short interval of time to produce limited alloying between the iron and such alloy or composition. The mold is then cooled causing the aforementioned alloy or composition melt to solidify as an ingot firmly bonded to the iron electrode. The optimum temperature for contact formation in a hydrogen atmosphere has been found to lie in the aforementioned range, since above 1100° C. the alloying advances too rapidly to be accurately controlled, and below 920° C. it may be retarded by solid particles of the alloy or composition which have not had time to absorb heat and melt.

The time of exposure at 920° C. to 1100° C. must likewise be carefully controlled to prevent excessive alloying or solution of the iron of the electrode in the alloy or composition melt, and consequent impairment of the electrical properties of the resultant thermoelectric element. The amount of iron which migrates into the alloy or composition melt depends upon the area of contact between the iron and the alloy or composition melt and the volume of the latter, as well as the time of explosure. More specifically, the time of exposure at a given temperature within the aforeindicated range is proportional to the volume, and inversely proportional to the area of contact. Accordingly, it has been found the maximum time of exposure in seconds at, for example 1100° C. (which will result in the migration of no more than 0.5% of iron into the alloy or composition melt) can best be expressed as ranging from about 12, for alloys constituting primarily lead and selenium, to 45, for alloys constituting primarily lead and tellurium, times the ratio of the volume of such alloy or composition melt to the area of engagement thereof with the electrode expressed in centimeters.

For example, as disclosed in the last mentioned application, the time of exposure for an element of the aforementioned alloy or composition of length 1.27 cm. and diameter 0.635 cm., placed in a mold as aforeindicated with its end in contiguous engagement with an iron electrode as aforedescribed is less than 60 seconds. Under such conditions, the thermoelectric element can be cast on an alpha-stability iron electrode at 1100° C. for from 6 to 60 seconds without contaminating the element with more than 0.5% iron by precipitation thereof throughout the element as the mold is cooled.

In the formation of bonded contact electrodes by the direct casting method aforedescribed of the application last mentioned, it is necessary, as taught in the application last mentioned, that the iron utilized be a phase-stabilized alloy of iron since the bond in this case is accomplished at a temperature 10° C. or more, depending upon the alloy or composition, above the transformation temperature of iron (this temperature being about 905° C. at which alpha-phase iron (ferrite) transforms into gamma-phase (austenite)). Such phase stabilization is necessary to avoid shearing the solid bond between the thermoelectric element and the electrode during cooling.

It is, however, preferable that the iron forming the bonded electrode in the aforedescribed method be stabilized in the alpha phase because the iron migration rate is substantially lower in this case than in the case of gamma-phase-stabilized iron, and hence the control of the exposure time is less critical. For example, when the exposure time at 1100° C. is limited to 30 seconds for a sample of nominal size as aforeindicated, the iron content of the contacted element can be held below the limit of 0.5% by weight when the electrode is alpha-phase stabilized.

Conventional alpha or gamma phase stabilizers well known to those skilled in the art may be utilized for the aforeindicated purposes. However, a preferred alpha stabilizer for high temperature contact is molybdenum, since the junction between the thermoelectric element and molybdenum-iron contact electrode appears to be more intimate and freer of small blow-holes than most other alloys.

Thus, the preferred contact electrode for thermoelectric elements formed in accordance with the aforedescribed method is, as disclosed in the last-mentioned application, alpha-stabilized iron and more particularly, iron stabilized in the alpha phase by the addition of from 2.7 to 7% molybdenum.

When a bonded electrode is formed by either the direct casting or fusion method aforedescribed, of the last mentioned application it is preferable to anneal the contacted thermoelectric element subsequent to contact formation at from 540° C. to 680° C. for from 10 to 20 hours to render the composition more homogeneous. It should also be understood that in the aforedescribed methods the iron should be substantially free of surface oxides and all contact formations accomplished under a reducing atmosphere since the aforementioned alloys or compositions alloy poorly with iron if an oxide layer is present.

While the direct casting method aforedescribed is somewhat simpler in that it permits casting of the thermoelectric elements simultaneously with formation of the bonded iron contact electrode, the fusion method aforedescribed is advantageous in that it may be employed for alpha or gamma stabilized alloys as well as pure iron and unstabilized alloys. However, high carbon steel is not a desirable electrode in either method since high carbon concentration in iron unduly lowers the iron transformation temperature. The fusion method has an added advantage in that the average iron concentration within the contacted element itself resulting from the bonding procedure is much less than in the direct casting method, and in fact, is, we have found, less than .01% by weight as an average proposition. Thus, even iron alloys containing relatively large concentrations of chromium, nickel, manganese, etc. (which are ordinarily detrimental to the electrical properties of the alloys and compositions aforementioned) can be used as contact electrodes without detrimental effect upon the electrical properties of the element due to their extremely small resulting concentration therein.

Referring again to Figure 1 after fabrication of semi-metallic thermocouple element or electrical conductor 15 and contacts 17 and 18 therewith as aforedescribed in accordance with the disclosure of the several aforementioned applications, such unit, as before, is disposed within the connected cold junction housing 11 and sheath 10. The cold junction contactor 13 may be assembled with the mounting unit 12, which in this instance must constitute a hermetic seal, which is then placed in the open end of the cold junction housing 11 with the contact portion 14 of the cold junction contactor 13 in engagement with contact 18 and positioning element 15 to engage contact 17 with the closed end 19 of the sheath 10. The seal assembly 12 may, as before, then be withdrawn a predetermined amount and soldered in place. The unit is thus assembled and, it being remembered that the expansion coefficients of the semi-metallic alloys abovedescribed and ferritic stainless steels are approximately respectively $18\times10^{-6}/°$ C. and $11\times10^{-6}/°$ C., functions as previously described.

It will be recognized that the stainless steel sheath 10, cold junction housing 11 and hermetic seal assembly including the cold junction contactor 13 provide a hermetically sealed atmosphere around the semi-metallic inner thermocouple element 15 to prevent oxidation and deterioration thereof.

Figure 2:
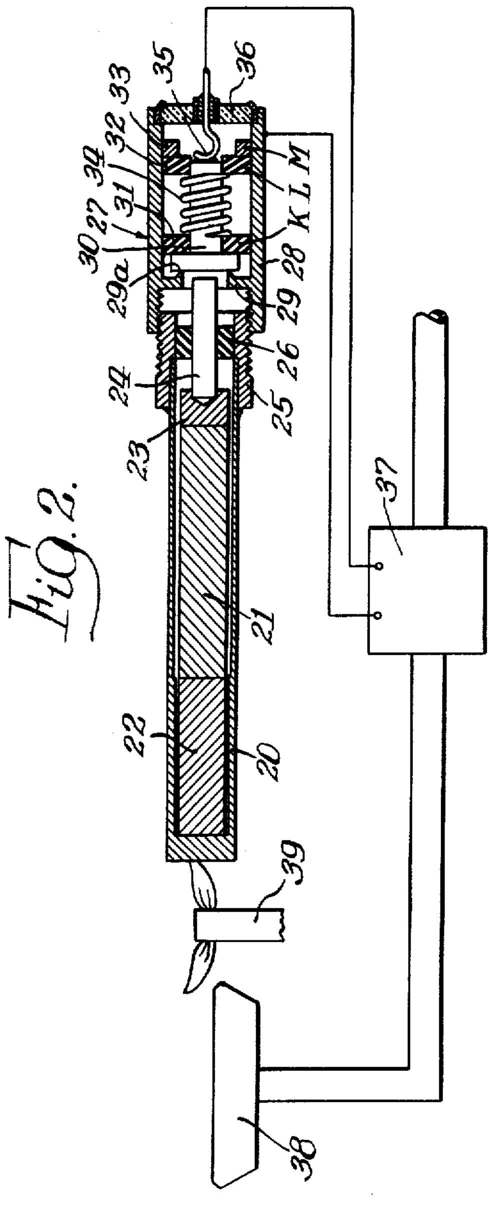
Figure 2 is a somewhat schematic cross-sectional view of a modified form of thermoelectric generator constructed in accordance with the present invention and showing an illustrative application of such a generator.

Referring now to Figure 2, there is shown another embodiment of our invention which similarly to the embodiment previously described comprises a generally cup-shaped cylindrical sheath 20 which forms one element of the thermocouple or generator and within which and protected by the sheath 20 is a second thermocouple element 21, the elements 20 and 21 being mechanically and electrically joined at one end only as through a contact electrode or heat transfer member 22 to be hereinafter described.

As before, the outer thermocouple element or electrical conductor 20, which functions as the one element of the thermocouple or generator, is preferably of a ferritic stainless steel, for example a high chromium stainless steel alloy, which as already noted has a relatively low thermal expansion coefficient, i. e., of about $11\times10^{-6}/°$ C. The thermocouple element or electrical conductor 21 is preferably fabricated of any of the aforementioned semi-metallic alloys last abovedescribed in detail in connection with the semi-metallic thermocouple element 15.

The elements 20 and 21 are mechanically and electrically connected at one end as by a contact electrode and heat transfer member 22 in accordance with the aforedescribed methods of contacting the above-described semi-metallic alloys. The member 22 may be welded at one end to the end wall of the outer element 20, and bonded at the other end to the inner element 21 to form the hot junction of the thermocouple. As already indicated, the contact electrode 22 may be of any iron base alloy but is preferably an austenitic stainless steel since such stainless steels exhibit coefficients of thermal expansion higher than that of the ferritic stainless steel elements 10 aforedescribed. Austenitic stainless steel has a thermal expansion coefficient of about $18\times10^{-6}/°$ C. which, it will be observed, substantially matches that of the semi-metallic element 21. The austenitic stainless steel member 22, however, as previously related has a thermal conductivity of .238 w./cm./° C. which, it will be observed, is substantially higher than that of the element 21 and desirably so for reasons which will hereinafter appear.

As will be apparent from the foregoing description, the inner thermocouple element 21 is connected electrically and mechanically to the outer thermocouple element 20 through the contact electrode 22 only, the remainder of the element 21 being circumferentially spaced from and within the outer element 20. The opposite end of the element 21 is free for movement with respect to the outer element 20. Since the coefficient of thermal expansion of the element 20 is less than that of the element 21 and its contact electrode 22, it will become apparent that upon heating or cooling of the outer end of the assembly, movement of the free end of the element 21 with respect to the outer element 20 will be afforded. Such relative movement is utilized in accordance with the present invention to afford rapid buildup of thermoelectric voltage in a thermoelectric circuit upon heating of the thermoelectric generator and rapid diminution of such voltage therein upon cooling of the thermoelectric generator, as will hereinafter be described.

Referring again to Figure 2, the thermocouple assembly further comprises a second contact electrode 23 which may be of iron bonded to, as above-described, or otherwise in engagement with the free end of the thermocouple element 21 to provide a cold junction for the thermoelectric generator.

The thermocouple assembly illustrated further comprises an inner cold junction electrical connector 24 preferably of brass, attached to the cold junction electrode 23, and an externally threaded collar 25 also preferably of brass brazed or otherwise suitably connected to the cold end of the sheath 20, such connection between the sheath 20 and collar 25 affording the thermocouple an external cold junction. An electrically insulating annular washer 26 is preferably inserted in the collar 25 to surround the electrical connector 24 for axial alignment within the collar.

To the aforedescribed thermocouple assembly is assembled a thermoelectric circuit-controlling means designated generally by the reference numeral 27. The circuit-controlling means 27 aforementioned comprises an internally threaded housing 28 adapted to be threaded onto the collar 25 in hermetically sealed relationship, the housing 28 having an integrally formed internal shoulder 29 through which the cold junction electrical connector 24 is adapted to pass. Additionally, the shoulder 29 may have an annular knife-edge contact surface *29a*. The control means 27 further comprises a contactor 30 mounted for reciprocal movement within the housing 28 and adapted to make a low resistance electrical contact with the knife-edge contact surface *29a*, as will be hereinafter described. The contactor 30 is supported for reciprocal movement within the housing 28 by electrically insulating washers 31 and 32, serving also to align the contactor 30 axially with respect to the housing 28 and its parts aforedescribed. A retainer ring 33 pressed into the housing 28 holds the washer 32 against outward movement while a biasing spring 34 abutting the inner sides of the washers 31 and 32 serves to bias the contactor 30 into engagement with the contact surface *29a*.

The thermoelectric generator aforedescribed further comprises a flexible electrical connector 35 preferably of copper strip or braided wire adapted to electrically connect to the outer end of the contactor 30, the flexibility of the connector 35 permitting reciprocating movement of the contactor 30 while maintaining electrical contact therewith. The electrical connector 35 is brought out through a hermetic seal 36, preferably of glass, and of the type well known in the art. Thus the entire thermoelectric generator is hermetically sealed for protection of the semi-metallic conductor or element 21 against oxidation or other environmental influences, as well as to preserve a low resistance electrical contact between contacts 30 and contact surface *29a*.

Electrical connections are made to the generator by connection of circuit wires to the electrical connector 35 on the outside of the hermetic seal 36 and also to the housing 28, which is electrically connected, as aforedscribed, to the outer thermocouple element 20.

As aforementioned, thermoelectric generators of the type aforedescribed may have various applications, that schematically shown in Figure 2 being merely illustrative. In the embodiment illustrated, the output of the thermoelectric generator is supplied to a control device designated generally by the reference numeral 37 connected in circuit with the electrical connector 35 and housing 28, as shown. Such control device may, for example, take the form of means for control of fluid fuel to a fluid fuel burning main burner 38 adapted to be ignited by the flame of a pilot burner 39 which also serves to supply heat to the hot junction of the thermoelectric generator. As will be apparent, should the flame of the pilot burner 39 become extinguished or for some reason fail to supply enough heat to the thermoelectric generator, the control device 37 may be deenergized to prevent dangerous accumulation of unburned fuel at the burner 38.

As aforementioned, in the foregoing application of the instant invention as well as in other applications thereof which will readily suggest themselves, it is highly desirable that the control device powered from the thermoelectric generator be deenergized as quickly as possible upon cooling of the hot junction of the thermoelectric generator. The thermoelectric generator aforedescribd, including the thermoelectric circuit-controlling means 27, affords this function in the following manner: When the hot end of the thermoelectric generator is heated, the thermocouple element 21 and its contact electrode 22, having a larger coefficient of thermal expansion than the sheath 20, expand for longitudinal displacement of the former with respect to the latter for engagement of the cold junction electrical conductor 24 with the contactor 30 and completion of the thermoelectric circuit. However, as long as the contactor 30 is in engagement with the contact surface 29*a*, the thermoelectric circuit is shunted or short-circuited so that only a small amount of the output of the generator will be transmitted to the control device. As soon as the thermocouple element 21 and its contact electrode 22 are displaced sufficiently to disengage the contactor 30 from the contact surface 29*a* by movement of the contactor 30 against its biasing spring 34 this short circuit is removed and the full output of the generator may be supplied to the control device 37 in a surge. As long as the tip of the thermoelectric generator is heated this condition prevails. However, as soon as the source of heat for the thermoelectric generator is removed or diminished sufficiently for contraction of the element 21 and its contact electrode 22, the contactor 30 reengages the contact surface 29*a* to short circuit the thermoelectric circuit and deenergize the control device, since as soon as the short circuit is established the voltage applied to the control device will drop sharply to a value below that sufficient for continued energization of the control device. Further contraction of the element 21 and its contact electrode 22 results in breaking of the circuit afforded by contact of the cold junction electrical connector 24 and the contactor 30 wherefor the voltage in the thermoelectric circuit drops to zero.

Figure 3:
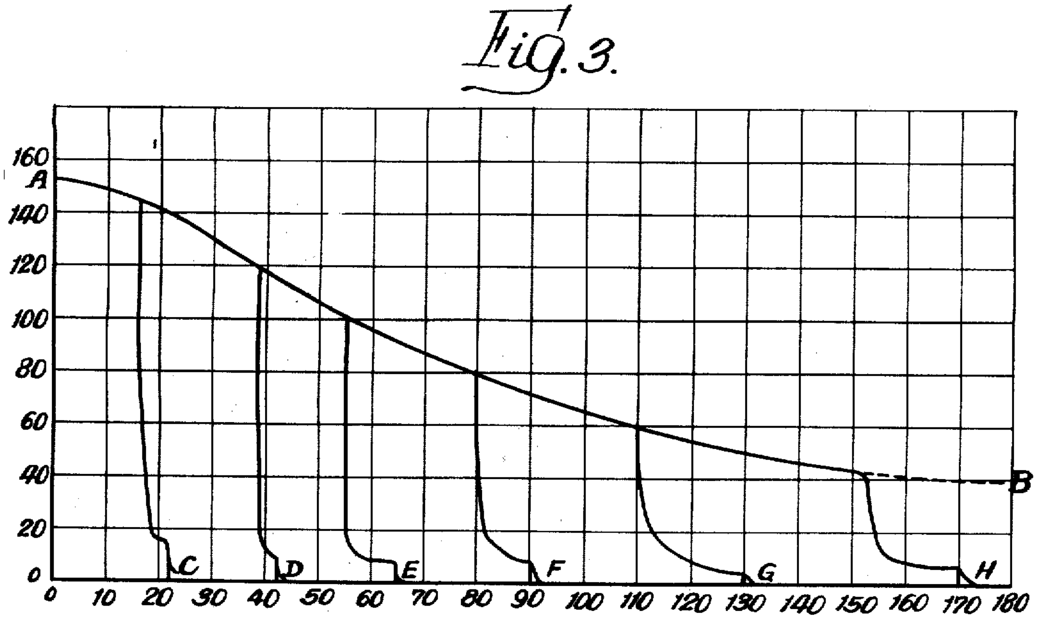
Figure 3 is a graphic illustration of the time response to cooling of thermoelectric generators constructed in accordance with the present invention.

The foregoing operation is graphically illustrated, by way for example of a thermoelectric generator incorporating a semi-metallic element as afore-described, in Figure 3 wherein the vertical axis is scaled to indicate the thermoelectric generator output in millivolts and the horizontal axis is scaled to indicate time in seconds after removal of the source of heat from the thermoelectric generator. In Figure 3 the curve AB illustrates the normal voltage decay of the thermoelectric generator described herein in the absence of the circuit-controlling means 27. As will be observed, it might take as long as 130 seconds before the thermoelectric voltage drops as low as 40 millivolts. In contrast, the curves AC, AD, AE, AF, AG and AH indicate the manner in which the thermoelectric voltage drops off sharply when the thermoelectric circuit is short circuited as aforementioned by engagement of the contactor 30 with its contact surface 29*a*, the aforementioned curves being for various contact spacings of the contactor 30 with respect to the cold junction electrical connector 24.

As aforeindicated, the thermoelectric assembly aforedescribed affords adjustabliity of the voltage drop-off time and value, which adjustability is afforded by variation in the aforementioned contact spacing. Such adjustability is afforded by threading the housing 28 inwardly or outwardly as desired on the collar 25. Thus the assembly affords adjustability of the dropout time over a wide range which may vary, as shown in Figure 4 in which time in seconds is plotted as the horizontal coordinate against contact spacing in inches as the vertical coordinate, from as low as a few seconds for a contact spacing of less than .0005 in. to 120 seconds for a contact spacing of .0037 in.

Conversely to the normal voltage decay of the thermoelectric generator described and the adjustability of the voltage drop-off time and value as abovedescribed, we have graphically illustrated in Figures 5 and 6 the normal voltage buildup of the thermoelectric generator and the adjustability of such voltage buildup time due to variation of contact spacing.

In Figure 5, in which again time is plotted in seconds as the horizontal coordinate and E. M. F. in millivolts as the vertical coordinate, curve IJ illustrates the normal voltage buildup of the thermoelectric generator above-described in the absence of the circuit-controlling means 27. It will be observed, about 120 seconds is required for the voltage to build up to a value of 140 millivolts. The curves IK, IL, IM, IN all indicate the voltage buildup for the number of seconds indicated on the horizontal coordinate of the graph after application of flame to the hot junction of the device, and at which selected current values the device can be caused to be effective in operation when desired at such values of E. M. F. by appropriated spacing of contactor 30 with respect to the cold junction electrical conductor 24 affording interruption of short circuiting by disengaging contactor 30 and contact surface 29.

In Figure 6, time in seconds is again plotted as the horizontal coordinate as against contact spacing in inches affording adjustability of the application of E. M. F. as desired, by threading housing 28 inwardly or outwardly on collar 25.

As aforementioned, the thermoelectric generator aforedescribed having a stainless steel outer element 20 and being hermetically sealed to protect the inner element 21 from oxidation and other deleterious environmental factors, is adapted to be subjected to relatively high temperatures by the selection of appropriate semi-metallic alloy for element 21; for example, the hot junction afforded by connection of the element 21 and its contact electrode 22 may be held at a temperature in the range 538° C. to 565° C. with the tip of the sheath 20 being at a somewhat higher temperature. The contact electrode 22 being of metal and having high thermal conductivity affords heat transfer from the tip of the thermocouple unit to the hot junction aforementioned, but an element 21 of semi-metallic alloy being of low thermal conductivity transfers very little heat, wherefor the inner cold junction may be, in the embodiment illustrated and described, maintained at a temperature less than 100 degrees centigrade in excess of ambient temperatures. Since a thermoelectric generator affords the greatest output when the temperature differential between its hot and cold junctions is at a maximum, it will be seen that the thermoelectric generator aforedescribed is capable of relatively high output.

It should be further noted that the greatest contribution to the expansion differential as between the sheath 20, on the one hand, and the thermocouple element 21 and contact electrode 22, on the other hand, comes from that portion of these members that is raised to the highest temperature. It will be seen that the contact electrode 22 being of high thermal conductivity is the largest contributor to such expansion differential. Moreover, since radiation cooling becomes more effective as the temperature of a surface is raised, the contact electrode 22 being at a much higher temperature throughout its length radiates more heat and effects rapid contraction of the inner assembly upon cooling of the generator when the heat source is removed. Thus, as illustrated in Figure 2, provision of a contact electrode 22 of austenitic stainless steel and of substantial length tends to amplify the difference in coefficient of thermal expansion as between the inner thermocouple element 21 and outer thermocouple element 20.

In fact, this effect is so amplified that with a sufficiently small contact space between the contactor 30 and its contact surface 29*a*, the thermoelectric generator may be adjusted to provide for shunting of the thermoelectric circuit and de-energization of any control device therein upon mere change of temperature at the tip of the thermoelectric generator as, for example, in the embodiment illustrated, diminution of the pilot burner flame due to conditions of reduced pressure of the fluid fuel. Such adjustment may be readily made in the manner previously described.

In accordance with the objects of the invention, it will also be observed that the thermoelectric generator aforedescribed being of simple construction and preferably of cylindrical parts to facilitate machining operations can be readily manufactured and assembled. The circuit-controlling means 27 may be readily fitted to the thermocouple assembly preferably under an inert atmosphere and adjusted to the desired contact separation. In such assembly the circuit-controlling means 27 is simply threaded on the collar 25 until the electrical connector 24 and contactor 30 are in engagement and then the housing 28 is backed off an amount affording the desired contact operation; for example, with a standard thread of 24 per inch, approximately .001 inch contact separation will be afforded by 9 degree rotation of the housing 28 with respect to the collar 25.

We claim:

1. A thermoelectric generator comprising, a plurality of thermoelectric elements of different thermoelectric properties at least one of which is semi-metallic alloy, means for hermetically sealing said semi-metallic thermocouple element from ambient atmosphere, said thermoelectric elements being characterized by different coefficients of expansion and contraction, thermoelectric circuit means including said thermoelectric elements, and contact means in said circuit operable for controlling the same responsive to movement of one of said thermoelectric elements relative to the other.

2. A thermoelectric generator comprising, a semi-metallic thermoelectric element, a second thermoelectric element having different thermoelectric properties than said semi-metallic thermoelectric element and being connected thereto to provide a hot junction, means including said second thermoelectric element means for enclosing and affording hermetic sealing of said semi-metallic thermoelectric element, contact means for affording connection of said thermoelectric element in series relation, and said semi-metallic thermoelectric element having a greater coefficient of thermal expansion than said second thermoelectric element, whereby upon heating of said hot junction said semi-metallic thermoelectric element is disposed under compression within said second thermoelectric element to afford series connection of said thermoelectric elements through said contact means.

3. A thermoelectric generator comprising, a semi-metallic thermoelectric element, a second thermoelectric element having different thermoelectric properties than said semi-metallic thermoelectric element and being joined thereto to provide a hot junction, said second thermoelectric element forming an enclosure for said semi-metallic thermoelectric element, contact means carried by said semi-metallic thermoelectric element, spring-loaded contact means within said second thermoelectric element, and said thermoelectric elements having different coefficients of thermal expansion, whereby upon heating of said hot junction relative expansion of said thermoelectric elements affords a circuit therebetween through said contact means with said spring-loaded contact means effecting compressing of said semi-metallic thermoelectric element.

4. A thermoelectric generator comprising, a semi-metallic thermoelectric element, a second thermoelectric element having different thermoelectric properties than said semi-metallic thermoelectric element and being joined thereto to provide a hot junction, said second thermoelectric element forming an enclosure for said semi-metallic thermoelectric element and being open at one end, means for hermetically sealing the open end of said second thermoelectric element, contact means carried by said semi-metallic thermoelectric element and extending toward said open end, spring-loaded contact means within said second thermoelectric element adjacent the open end thereof, and said thermoelectric elements having different coefficients of thermal expansion, whereby upon heating of said hot junction relative expansion between said thermoelectric elements affords a circuit between said contact means with said spring-loaded contact means effecting compressing of said semi-metallic thermoelectric element.

5. A thermoelectric generator comprising, a semi-metallic thermoelectric element, a second thermoelectric element having different thermoelectric properties than said semi-metallic thermoelectric element and being joined thereto to provide a hot junction, said second thermoelectric element forming an enclosure for said semi-metallic thermoelectric element, said thermoelectric elements having different coefficients of thermal expansion, contact means between said thermoelectric elements for affording series connection of said thermoelectric elements upon heating of said hot junction to effect relative expansion between said thermoelectric elements, and further contact means for said second thermoelectric element adapted upon cooling of said hot junction to effect shunting of said thermoelectric elements.

6. A thermoelectric generator comprising, a semi-metallic thermoelectric element, a second thermoelectric element having different thermoelectric properties than said semi-metallic thermoelectric element and being joined thereto to provide a hot junction, said second thermoelectric element forming an enclosure for said semi-metallic thermoelectric element, contact means carried by said semi-metallic thermoelectric element, spring-loaded contact means within said second thermoelectric element, said thermoelectric elements having different coefficients of thermal expansion, whereby upon heating of said hot junction relative expansion between said thermoelectric elements afford a series circuit between said contact means with said spring-loaded contact means effecting compressing of said semi-metallic thermoelectric element, and further contact means for said second thermoelectric element adapted upon cooling of said hot junction to be engaged by said spring-loaded contact means to shunt said thermoelectric elements.

7. A thermoelectric generator comprising, a semi-metallic thermoelectric element, a second thermoelectric element having different thermoelectric properties than said semi-metallic thermoelectric element and being connected thereto to provide a hot junction, means including said second thermoelectric element for enclosing and affording hermetic sealing of said semi-metallic thermoelectric element, said semi-metallic thermoelectric element having a greater coefficient of thermal expansion than said second thermoelectric element, terminals for each of said thermoelectric elements, and means actuated by the differential thermal expansion and contraction of said thermoelectric elements for applying the voltage developed by heating of said hot junction to said terminals and removal of said voltage therefrom upon cooling of said hot junction at predetermined values of said voltage.

8. A thermoelectric generator comprising, a pair of elongated thermoelectric elements having different thermoelectric properties, one of said thermoelectric elements being of tubular form for coaxially enclosing the other of said thermoelectric elements and said thermoelectric elements being associated with each other to afford a hot junction, contact means associated with said thermoelectric elements for affording connection thereof in series relation, said other thermoelectric element having a greater coefficient of thermal expansion than said one thermoelectric element, whereby upon heating of said hot junction said other thermoelectric element is disposed under compression within said one thermoelectric element to afford series connection of said thermoelectric elements through said contact means.

References Cited in the file of this patent

UNITED STATES PATENTS

| | | |
|---|---|---|
| 1,910,362 | Powers | May 23, 1933 |
| 2,150,415 | Branche | Mar. 14, 1939 |
| 2,226,846 | Clark | Dec. 31, 1940 |
| 2,276,909 | Alfery | Mar. 17, 1942 |
| 2,602,095 | Faus | July 1, 1952 |
| 2,720,615 | Betz | Oct. 11, 1955 |

UNITED STATES PATENT OFFICE

CERTIFICATE OF CORRECTION

Patent No. 2,858,350 October 28, 1958

Robert W. Fritts et al

It is hereby certified that error appears in the printed specification of the above numbered patent requiring correction and that the said Letters Patent should read as corrected below.

Column 3, line 3, for "adjustably" read -- adjustability --; line 64, for "assemblied" read -- assembled --; column 16, lines 31 and 32, for "appropriated" read -- appropriate --.

Signed and sealed this 30th day of June 1959.

(SEAL)
Attest:

KARL H. AXLINE

Attesting Officer

ROBERT C. WATSON

Commissioner of Patents